United States Patent [19]

Steine et al.

[11] 3,977,869

[45] Aug. 31, 1976

[54] INDIUM-CONTAINING, LOW SILVER COPPER-BASE FILLER METAL

[75] Inventors: Hans T. Steine, Crissier, VD; Wolfgang Simm, Lausanne, both of Switzerland; Joseph F. Quaas, Island Park, N.Y.

[73] Assignee: Eutectic Corporation, Flushing, N.Y.

[22] Filed: Aug. 14, 1975

[21] Appl. No.: 604,793

[52] U.S. Cl. ............................. 75/153; 75/157.5; 75/160; 228/263
[51] Int. Cl.² ........................................... C22C 9/04
[58] Field of Search .................. 75/153, 157.5, 160; 228/263

[56] References Cited
UNITED STATES PATENTS

| | | | |
|---|---|---|---|
| 2,235,634 | 3/1941 | Hensel et al. | 75/157.5 |
| 2,355,067 | 8/1944 | Goldsmith | 75/157.5 |
| 3,091,527 | 5/1963 | Pollock | 75/162 |
| 3,841,921 | 10/1974 | Shapiro et al. | 75/162 |

FOREIGN PATENTS OR APPLICATIONS

| | | | |
|---|---|---|---|
| 1,385,191 | 2/1975 | United Kingdom | 75/157.5 |

Primary Examiner—W. Stallard
Attorney, Agent, or Firm—Hopgood, Calimafde, Kalil, Blaustein and Lieberman

[57] ABSTRACT

A filler metal composition and method are provided for producing strong brazed joints between metal parts, e.g. steel parts, assembled in joint-forming relationship with each other, the filler metal comprising an indium-containing, low silver, copper base brazing alloy consisting essentially by weight of about 0.5% to 15% Ag, about 1% to 14% In, about 50% to 85% Cu, up to about 0.6% Si and the balance essentially zinc.

10 Claims, No Drawings

INDIUM-CONTAINING, LOW SILVER COPPER-BASE FILLER METAL

This invention relates to indium-containing, low silver, copper-base filler metal and to a method of brazing metal parts, and also to brazed joints produced with said alloys.

STATE OF THE ART

It is known to torch braze, or furnace braze, or vacuum braze metal parts, such as steel parts, using nonferrous brazing alloys, also known as filler metals, typical filler metals being the well known silver and copper-zinc brazing alloys. The silver alloys are more costly and, in general, melt at lower temperatures than copper-zinc alloys.

With regard to torch brazing, the heat is obtained from a gas flame or flames impinging on or near the joint being brazed, the torch employed generally being of the hand-held type. Generally, a flux is applied to the joint before heating to promote the flow and bonding of filler metal throughout the joint being brazed, the flux being applied as a powder, paste or liquid, or as a mixed paste of flux and filler metal. As surface oxide films inhibit the wetting of the base metal by the filler metal and, therefore, the capillary flow thereof into the joint, the fluxes employed should have sufficient chemical and physical activity to reduce, dissolve or remove the thin oxide surface films without substantially attacking the metal parts being joined.

Typical fluxes include type AWS 3A containing boric acid, borates, fluorides, fluoborates and wetting agents, said fluxes being employed at the useful temperature range of about 1,050° to 1,600°F (565° to 872°C); and type AWS 3B which is similar to 3A but differs in being useful at a temperature range of about 1,350° to 2,100°F (733° to 1,150°C), etc.

As regards furnace brazing, the parts to be brazed are generally held together by jigs and the parts passed through the furnace on an endless belt, the furnace being maintained at the desirable brazing temperature, a cooling zone being provided to assure solidification of the braze alloy at the joint before the parts leave the end of the furnace. The atmosphere may be inert or slightly reduced, and may comprise an endo gas, nitrogen, 90-10 nitrogen-hydrogen gas mix, and the like.

As regards vacuum brazing, fluxes are not required so long as the metal parts are cleaned.

The filler metal should exhibit relatively high fluidity at the brazing temperatures employed and also exhibit near perfect affinity to ferrous materials and alloys being joined. An example of an exceedingly effective brazing alloy is that disclosed in the prior U.S. Pat. No. 2,279,284 which issued to Rene D. Wassermann, this alloy containing substantial amounts of silver and nickel combined with a major proportion of copper and a large amount of zinc.

As stated hereinabove, a filler metal of relatively high fluidity is most desirable as good fluidity and good wetting are essential in obtaining the desired combination of physical properties in the brazed joint.

In this connection, certain silver alloy filler metals have been developed and are well known in the commercial brazing art, the alloys being highly fluid and having good wetting properties with regard to the brazing of low-carbon and low-alloy steels. The alloys previously developed are characterized by the presence of relatively high silver and of substantial amounts of cadmium, the composition of the commercial alloys ranging by weight from about 30 to 50% Ag, about 15 to 30% Zn, about 15 to 25% Cd and the balance essentially copper ranging from about 15 to 35%.

In light of the recent concern of the environmentalists over the use of toxic materials in articles of commerce, especially in food handling equipment, considerable on-going investigations have been instituted dealing with the problem of avoiding the use of certain toxic chemicals and metals in materials in which the end use could produce toxic side effects on people handling such materials, top on the list being the use of cadmium in brazing alloys. In addition, some of the investigations have been concerned with reducing the use of silver in brazing alloys due to the relatively high increase in the price of silver.

It would thus be desirable to provide alternate filler metal compositions which can be used in place of filler metals containing high amounts of silver and substantial amounts of cadmium.

We have now developed such a filler metal which has the desired properties that a good filler metal should have while avoiding the toxicity problem of cadmium and the high cost of silver. The filler metal is applicable to the brazing of low carbon and low alloy steels, stainless steel, copper and copper-base alloys, nickel and nickel-base alloys and the like.

OBJECTS OF THE INVENTION

It is thus the object of the present invention to provide a novel filler metal for use in the brazing of metal parts together, said metal being characterized as an indium-containing, low silver, copper-base brazing alloy.

Another object is to provide a method of brazing and a brazed joint produced as a product thereof, the braze alloy employed in the method being a filler metal characterized as an indium-containing, low silver, copper-base brazing alloy.

These and other objects will more clearly appear from the following disclosure and the appended claims.

STATEMENT OF THE INVENTION

Stating it broadly, one embodiment of the invention is directed to a filler metal comprising an indium-containing low silver, copper-base brazing alloy consisting essentially by weight of about 0.5 to 15% Ag, about 1 to 14% In, about 50 to 85% Cu, up to about 0.6% Si and the balance essentially Zn. A preferred range is about 1 to 10% Ag, about 2.5 to 10% In, about 55 to 80% Cu, up to about 0.4% Si and the balance essentially Zn, at least 5%.

The foregoing compositions should preferably be free of cadmium, although cadmium may be present in substantially non-toxic amounts in place of zinc of less than 2%. Tin, if present, should be as low as is consistently possible to avoid embrittlement and may replace zinc in an amount not exceeding about 2% by weight.

Iron, manganese and nickel can be tolerated. Nickel may replace copper in amounts ranging up to about 20% by weight. Each of iron and manganese may range up to about 0.5 and 1%, respectively.

The elements Pb, Al, Zr, Mg, Sb and Bi should be avoided as far as is possible, the total amounts thereof not exceeding about 0.1% by weight.

The filler metal may be used in the form of shim, rod, powder, flux-coated rod for torch application. The alloy powder may also be mixed with a compatible flux vehicle for use in the form of a paste type product.

| Element | Alloy No. 1 | 2 | 3 |
|---|---|---|---|
| Ag | 2.5% | 10% | 5% |
| In | 7.5% | 10% | 2.5% |
| Zn | 30 % | 10% | 32.5% |
| Cu | 59.8% | 69.8% | 59.8% |
| Si | 0.2% | 0.2% | 0.2% |
| Solidus Temp. | 820°C | 853°C | 832°C |
| Liquidus Temp. | 853°C | 903°C | 865°C |

As will be noted from the examples, the alloy composition may range by weight from about 2.5 to 10% Ag, about 2.5 to 10% In, about 60 to 70% Cu, up to about 0.2% Sn and the balance essentially Zn ranging from about 10 to 35%.

Over the broad range of composition, the melting point may range from about 850° to 925°C, the brazing temperature ranging from about the liquidus temperature (the melting point) up to about 110°C above the liquidus temperature.

DETAILS OF THE INVENTION

As stated hereinabove, the invention is particularly applicable to the brazing of steel parts. However, the filler metal is applicable to the brazing of other metal parts as well.

As illustrative of the method of the invention, the following examples are given:

EXAMPLE 1

Two low carbon steel strips are lap-joined together by using a filler metal containing by weight 5% Ag, 2.5% In, 32.5% Zn, about 0.2% Si and 59.8% Cu. The strips are first cleaned and then brushed with a flux paste referred to as type AWS 3A comprising boric acid, sodium borate, lithium fluoride and sodium fluoborate. A strip of the filler metal is placed between the steel strips at the overlapped portions and the flame of a gas torch played upon the lap joint until the moisture in the paste has evaporated and the flux has begun to fuse. The heating is continued until a temperature of 925°C is reached at which temperature the filler metal is very fluid and moves by capillary action between the overlapped steel strips and completely wets the joint. The flame is removed and the braze allowed to solidify to provide a good, clean, strong joint.

EXAMPLE 2

Alloy No. 1 in the table (2.5% Ag, 7.5% In, 30% Zn, 0.2% Si and 59.8% Cu) is particularly useful in the production of screens in which copper screening is brazed to a brass sieve collar.

The copper screening is pre-cut and properly jigged within the lower section of the brass sieve collar. Alloy No. 1 in powder form is mixed with a flux vehicle comprising boric acid and potassium metaborate to provide a paste which is applied to the joint either with a brush or an automatic dispensing apparatus. Heat is applied to evaporate moisture from the paste and to melt the filler alloy and the flux (e.g. about 875°C) and the braze alloy then solidified. The flux residues are removed by immersion of the finished screen in hot water.

EXAMPLE 3

In this example, a Type 316 stainless steel tube or pipe is brazed to a Monel pump housing (Monel is a trademark for a nickel-copper alloy). In this instance, Alloy No. 2 is used (10% Ag, 10% In, 10% Zn, 0.2% Si and 69.8% Cu), an oxyfuel gas torch being employed to apply the heat and provide a brazing temperature of about 925°C. The filler metal is used in the form of a flux-coated product comprising a rod extrusion coated with a borate-potassium fluoride flux. The tube is jointed to the housing after solidification of the filler metal and the flux residue removed with hot water.

As will be clearly apparent, the invention provides, in addition to a filler metal composition, a method of brazing metal parts together comprising assembling said metal parts in joint-forming relationship with each other, with the filler metal disposed in proximity to the assembled parts, applying heat to the joint-forming assembly and upon the filler metal sufficient to melt said filler metal and cause it to flow in and about the joint-forming portion of said assembly, and then allowing the molten filler metal to solidify and form a strong joint between said metal parts.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A filler metal for use in brazing metal parts together, said filler metal comprising an indium-containing, low silver, copper-base brazing alloy consisting essentially by weight of about 0.5 to 15% Ag, about 1 to 14% In, about 50 to 85% Cu, up to about 0.6% Si and the balance essentially Zn.

2. The filler metal of claim 1, wherein the composition consists essentially of about 1 to 10% Ag, about 2.5 to 10% In, about 55 to 80% Cu, up to about 0.4% Si and the balance essentially Zn.

3. The filler metal of claim 2, wherein the composition consists essentially of about 2.5 to 10% Ag, about 2.5 to 10% In, about 60 to 70% Cu, up to about 0.2% Si and the balance essentially Zn ranging from about 10 to 35%.

4. A brazed joint comprising at least a pair of metal parts joined together by a filler metal comprising an indium-containing, low silver, copper-base brazing alloy consisting essentially by weight of about 0.5 to 15% Ag, about 1 to 14% In, about 50 to 85% Cu, up to about 0.6% Si and the balance essentially Zn.

5. The brazed joint of claim 4, wherein the filler metal composition in the joint consists essentially of about 1 to 10% Ag, about 2.5 to 10% In, about 55 to 80% Cu, up to about 0.4% Si and the balance essentially Zn.

6. The brazed joint of claim 4, wherein the filler metal composition in the joint consists essentially of about 2.5 to 10% Ag, about 2.5 to 10% In, about 60 to 70% Cu, up to about 0.2% Si and the balance essentially Zn ranging from about 10 to 35%.

7. A method of brazing metal parts together which comprises, assembling said metal parts in joint-forming relationship with each other with a filler metal disposed in brazing proximity thereto, said filler metal comprising an indium-containing, low silver, copper-base brazing alloy consisting essentially of about 0.5 to 15% Ag, about 1 to 14% In, about 50 to 85% Cu, up to about 0.6% Si and the balance essentially Zn, applying heat to said joint-forming assembly and upon said filler metal sufficient to melt said filler metal and cause it to flow in and about the joint-forming portion of said assembly and then allowing the molten filler metal to solidify and form a strong joint between said metal parts.

8. The method of claim 7, wherein the filler metal forming the joint consists essentially of about 1 to 10% Ag, about 2.5 to 10% In, about 55 to 80% Cu, up to about 0.4% Si and the balance essentially Zn.

9. The method of claim 7, wherein the filler metal forming the joint consists essentially of about 2.5 to 10% Ag, about 2.5 to 10% In, about 60 to 70% Cu, up to about 0.2% Si and the balance essentially Zn ranging from about 10 to 35%.

10. The method of claim 7, wherein said method is carried out in the brazing together of ferrous metal parts.

* * * * *